United States Patent
Berghel et al.

(10) Patent No.: US 7,984,849 B2
(45) Date of Patent: Jul. 26, 2011

(54) PORTABLE MAGNETIC STRIPE READER FOR CRIMINALITY SECURITY APPLICATIONS

(75) Inventors: Hal Berghel, Las Vegas, NV (US); Dennis Cobb, Las Vegas, NV (US); Michael Sthultz, Las Vegas, NV (US)

(73) Assignee: University of Nevada, Las Vegas, Las Vegas, NV (US)

( * ) Notice: Subject to any disclaimer, the term of this patent is extended or adjusted under 35 U.S.C. 154(b) by 611 days.

(21) Appl. No.: 11/504,483

(22) Filed: Aug. 15, 2006

(65) Prior Publication Data

US 2007/0040019 A1 Feb. 22, 2007

(51) Int. Cl.
*G06K 5/00* (2006.01)
(52) U.S. Cl. ......... 235/380; 235/375; 235/449; 235/493
(58) Field of Classification Search .................. 235/380, 235/375, 449, 493
See application file for complete search history.

(56) References Cited

U.S. PATENT DOCUMENTS

| | | | | |
|---|---|---|---|---|
| 4,013,894 A * | 3/1977 | Foote et al. | ................... | 250/569 |
| 4,041,279 A * | 8/1977 | Foote | ........................... | 235/440 |
| 4,304,990 A * | 12/1981 | Atalla | ............................. | 380/45 |
| 4,513,437 A | 4/1985 | Chainer et al. | ................ | 382/120 |
| 4,628,195 A * | 12/1986 | Baus | ............................. | 235/440 |
| 4,641,017 A | 2/1987 | Lopata | ......................... | 235/457 |
| 4,643,453 A | 2/1987 | Shapiro et al. | .................. | 283/73 |
| 4,667,087 A | 5/1987 | Quintana | ..................... | 235/380 |
| 5,103,486 A | 4/1992 | Grippi | ........................... | 382/116 |
| 5,163,098 A | 11/1992 | Dahbura | ........................ | 705/75 |
| 5,247,137 A | 9/1993 | Epperson | ................... | 178/19.04 |
| 5,365,046 A | 11/1994 | Haymann | ...................... | 235/380 |
| 5,397,881 A | 3/1995 | Mannik | ........................ | 235/380 |
| 5,412,727 A * | 5/1995 | Drexler et al. | ................. | 713/186 |
| 5,446,273 A | 8/1995 | Leslie | ............................ | 235/487 |
| 5,538,291 A | 7/1996 | Gustafson | .................... | 235/487 |
| 5,774,571 A | 6/1998 | Marshall | ...................... | 382/119 |
| 5,988,500 A | 11/1999 | Litman | ......................... | 235/450 |
| 6,053,406 A | 4/2000 | Litman | ......................... | 235/449 |
| 6,094,643 A | 7/2000 | Anderson et al. | .............. | 705/44 |
| 6,254,000 B1 | 7/2001 | Degen et al. | .................. | 235/380 |
| 6,254,002 B1 | 7/2001 | Litman | ......................... | 235/450 |
| 6,628,808 B1 * | 9/2003 | Bach et al. | ..................... | 382/115 |
| 6,676,017 B1 | 1/2004 | Smith, III | ..................... | 235/380 |
| 6,832,003 B2 * | 12/2004 | McGrew | ....................... | 382/210 |
| 6,844,660 B2 | 1/2005 | Scott | ............................ | 310/334 |
| 6,850,916 B1 | 2/2005 | Wang | ............................ | 705/64 |
| 7,044,368 B1 * | 5/2006 | Barron | .......................... | 235/380 |
| 7,309,012 B2 * | 12/2007 | von Mueller et al. | ......... | 235/449 |
| 2002/0031266 A1 * | 3/2002 | McGrew | ....................... | 382/210 |
| 2004/0019564 A1 | 1/2004 | Goldthwaite et al. | .......... | 705/44 |
| 2004/0034604 A1 | 2/2004 | Klebanoff | ........................ | 705/65 |
| 2004/0258281 A1 | 12/2004 | Delgrosso et al. | ............. | 382/115 |
| 2005/0173530 A1 * | 8/2005 | DeLand et al. | ................ | 235/449 |

(Continued)

*Primary Examiner* — Daniel A Hess
*Assistant Examiner* — Paultep Savusdiphol
(74) *Attorney, Agent, or Firm* — Mark A. Litman & Associates, P.A.

(57) ABSTRACT

A security device comprises a portable magnetic stripe reader and computing functionality associated with the magnetic stripe reader, such as a credit card reader, drivers license reader, debit card reader, club card reader, or any other element that can be mechanically read. A single device may be needed for evaluation of each type of stripe carrying product, or a single device may have multiple functions and can be used (with or without switching to specific identification sequences) for evaluation of different magnetic stripe carrying products. It may be used as a law enforcement device, particularly to combat identity theft and financial fraud.

4 Claims, 2 Drawing Sheets

U.S. PATENT DOCUMENTS

| | | | |
|---|---|---|---|
| 2006/0032908 A1* | 2/2006 | Sines | 235/380 |
| 2006/0049255 A1* | 3/2006 | von Mueller et al. | 235/449 |
| 2006/0049256 A1* | 3/2006 | von Mueller et al. | 235/449 |

* cited by examiner

CARDSLEUTH HARDWARE BLOCK DIAGRAM

PORTABLE MAGNETIC STRIPE READER FOR CRIMINALITY SECURITY APPLICATIONS

BACKGROUND OF THE INVENTION

1. Field of the Invention

The present invention relates to the field of security, particularly identification and economic security, and more particularly to such security in combination with cards or elements that have information that is readable with magnetic stripe readers. The invention also relates to devices that may be used to assist in maintaining security and detecting fraudulent information or at least fraudulently applied information.

2. Background of the Art

It is critical to the security of economic systems that the means of implementing economic transactions not be reproducible without providing independent value into that economic system. This is why actions such as forgery, in which false replications are made of economic transactional items such as checks, currency, credit cards and the like, are serious threats to the security interests of people, businesses and nations. There are severe criminal penalties attached to the commission of these crimes of forgery or counterfeiting because of the potential for widespread societal harm from counterfeiting. Unfortunately, technological advances aid the enactment of the crime of forgery as much as it improves the detection of false replications.

The conflict between forgery and detection is hardly new, tracing back further than Greek history, where the proposition of Archimedes' principle was based on an effort to enable detection of forgery. Archimedes was an advisor to the state, which had commissioned the molding of a solid gold crown for a religious ceremony. The authorities wished to assure that the crown was in fact pure gold, but they could not cut into the crown once it had been made as that would have been sacrilegious. While sitting in a bath tub, Archimedes noted the rise and fall of the water level as he lifted various parts of his body in and out of the tub. He predicted that the volume of water displaced was equal to either the volume submerged in the water or the weight of material which floated on the water. The story has it that he ran through the streets yelling "Eureka!" at the discovery, and upon submerging a block of gold equal to the weight of the crown, found that a different volume of water was displaced by the crown than the block of gold. The two items were of different densities and therefore the crown was not pure gold. The forgery was thus detected.

It is both a Federal and state offense to be in unauthorized possession of credit or debit cards belonging to another person (as few as two cards in some states). To avoid arrest and prosecution, identity thieves record stolen credit card numbers and related information in two ways:

(1) Thieves will record stolen debit or credit card information on the magnetic stripe affixed to a plastic card that does not have the appearance of a credit/debit card but can be read by a standard credit card reader. A favorite example is a hotel room entry, key card. Another is a casino membership player card.

(2) Thieves will disguise the encoded stolen data so that when a law enforcement officer uses a portable reader to read the card, the card will not be recognized, by a standard card reader, as a credit or debit card. Of course, a disguised card cannot be read by an ATM either. So, the thieves subsequently re-activate a disguised card by unscrambling, removing or adding the data, effectively removing the disguise, before a card is used.

There are examples of thieves being caught with hundreds of room keys who could not be arrested because the on-site law enforcement officers did not have an available magnetic stripe reader or because the cards did not show up on card readers as credit or debit cards.

The inventors anticipate that soon after card readers are designed that can penetrate disguised data, thieves will change their encoding schemes, or disguises, in an attempt to stay one step ahead of law enforcement. By equipping law enforcement officers with portable readers that have been consistently, and automatically, updated to combat each new disguise scheme, more identity thieves will be apprehended.

U.S. Pat. Nos. 5,988,500; 6,053,406; and 6,254,002 (Litman) describe that security may be enhanced for any magnetically readable system that may be applied or built into items, such as apparel, credit cards, currency, identification cards, or other transactional items. These and similar items, with informational content that can be varied may be used in systems for authenticating items and/or transactions. Such as system and method could include, for example, a method of verifying the authenticity of the source of information comprising: a) providing a first signal from a source of information by moving an item along a path relative to a reading element, said relative movement along said path allowing a signal to be read that identifies the speed of relative movement of said item with respect to said reading element at a time during which information is being obtained from said item, b) transmitting said signal to a location where prior records or information attributed to previous signal from said item are stored, c) comparing said first signal to a defined signal(s) attributed to previous signals from said item, d) said comparing evaluating whether said first signal has a level of conformity to said defined signal(s) which exceeds a predetermined level of conformity, and e) providing a warning signal if the predetermined level of conformity is not achieved or is not exceeded.

Biometric tests or analysis for security are also being developed. Current stylus-type verification systems use metric-type sensors-accelerometers and pressure sensors to measure stylus pressure and stroke sweep in the users' signature. U.S. Pat. No. 5,774,571 (Marshall) discloses a stylus with multiple sensors for biometric verification including grip pressure sensors and gyroscopes. U.S. Pat. No. 4,513,437 (Chainer et al.) discloses another data input stylus for signature verification which includes accelerometers and pressure sensors. U.S. Pat. No. 5,247,137 (Epperson) discloses a stylus that enables biometric identification by means of comparison of graphics data and textural data from a remote location. The stylus also captures strokes and gestures which can also be used for confirming identification. U.S. Pat. No. 5,103,486 (Grippi) discloses a system for using a combination of biometrics at POS terminals. Prisms are used to capture the fingerprint of the index finger while the individual signs his/her name. The fingerprint image and the signature are processed to form a composite representative for comparison with information shown on a credit card for processing of commercial transactions.

Various improved credit cards and methods are known in the prior art for preventing credit card fraud. U.S. Pat. No. 5,538,291 to Gustafson discloses a credit card which must be enabled by a separate mechanical key lock. U.S. Pat. No. 5,446,273 to Leslie discloses a credit card with encrypted personal information on the cardholder. U.S. Pat. No. 5,397,881 to Mannik discloses a credit card magnetically written with multiple expiration dates. U.S. Pat. No. 5,365,046 to Haymann discloses a credit card associated with a personal identification number, which must be verified before a transaction can be completed. U.S. Pat. No. 5,163,098 to Dahbura discloses a credit card system which uses an encryption algorithm to generate a first encoded text from the card number and a password supplied by the user. The card user is verified by comparing the first encoded text with an encoded text recorded on the card. U.S. Pat. No. 4,667,087 to Quintana discloses a credit card with a keyboard and a microprocessor. U.S. Pat. No. 4,643,453 to Shapiro et al. discloses a credit card with auxiliary characters and corresponding dates at which each of the characters should be used. U.S. Pat. No. 4,641,017 to Lopata discloses a credit card with a hologram.

U.S. Pat. No. 6,094,643 (Anderson et al.) discloses how counterfeit financial card fraud may detected based on the premise that the fraudulent activity will reflect itself in clustered groups of suspicious transactions. A system for detecting financial card fraud uses a computer database comprising financial card transaction data reported from a plurality of financial institutions. The transactions are scored by assigning weights to individual transactions to identify suspicious transactions. The geographic region where the transactions took place as well as the time of the transactions are recorded. An event building process then identifies cards involved in suspicious transactions in a same geographic region during a common time period to determine clustered groups of suspicious activity suggesting an organized counterfeit card operation which would otherwise be impossible for the individual financial institutions to detect U.S. Pat. No. 6,254,000 (Degen et al.) describes how to identify and notify credit card issuing banks of an increased risk of credit card fraud. An early warning system assists credit card transaction processors and credit card issuing banks reduce occurrences of credit card fraud. By analyzing transaction data and credit card account information, an authorization decision is made and transmitted to the merchant. The authorization decision either approves or denies the credit card transaction. Conventional authorization systems employ a security code that can be transmitted with an authorization request to limit authorization to transactions including the proper security code. Because some issuing banks do not utilize the security code system, they are exposed to an increased risk of credit card fraud. The early warning system can be used to monitor the authorization decisions that are transmitted by the processor to the merchant. By compiling data on the occurrences of mismatches between an expected security code and the security code provided by the authorization request, the early warning system can notify processors and/or issuing banks that they are exposed to an increased risk of credit card fraud. Additionally, the early warning system can detect attempts by credit card thieves to identify exposed banks. Detected attempts at credit card fraud can also be used to initiate investigations to apprehend credit card thieves.

Published U.S. Patent Application No. 20040258281 (Delgrosso et al.) discloses a system for assisting in the biometric identification of users of credit cards. A system and method for verifying the identity of an individual for check cashing and other financial purposes is disclosed. A client, such as a bank or other financial institution, obtains a biometric identifier from a customer and can either try to match it in a local database or send it to a central database to be matched. Either database can be filtered according to a tag or location of the institution to speed up the matching process. The central database transmits information associated with the matched individual to determine whether or not to complete the transaction. A heuristic computing and software system is used with this technique.

Published U.S. Patent Application No. 20040034604 (Klebanoff) describes a method and system for identifying merchants at which payment accounts (e.g., credit card accounts) have been compromised. A set of "pre-fraud" payment accounts is first identified, the pre-fraud accounts being compromised accounts previously used to conduct legitimate transactions. A set of suspect merchant accounts is selected, wherein transactions with each of the suspect merchant accounts have been conducted with no fewer than a threshold number of the pre-fraud payment accounts, and wherein at least a threshold percentage of the business transacted with the merchant was transacted using pre-fraud payment accounts. Once selected, the suspect merchant accounts can be subjected to further investigation.

Published U.S. Patent Application No. 20040019564 (Goldthwaite et al.) describes an electronic payment system utilized by a customer to pay for the purchase of a good and/or a service with a payment card. The payment system includes a merchant server, an authentication server and a communication device. The merchant server is in connection with a first network and is adapted to receive a purchase order by the customer for the purchase of a good and/or a service and to create a digital purchase order. The authentication server is in connection with the first network and is adapted to receive the digital purchase order from the merchant server over the first network, format the digital purchase order into a first message and route it over a second network to the communication device. The communication device includes the identification information of the payment card, and is adapted to receive the first message from the authentication server over the second network, display the first message to the customer, request and receive authorization for payment for the purchase order from the customer, retrieve payment card identification information, request and receive payment card security information from the customer, and route the authorization result and in case of a positive authorization result the payment card identification and security information to the authentication server over the second network. The authorization result and payment card identification and security information are routed over the first network from the authentication server to the financial institution that has issued the payment card. The financial institution is asked to approve and execute the requested payment and to route the payment approval result through the authentication server to the merchant server and to the communication device.

U.S. Pat. No. 6,676,017 (Smith, III) describes a personal identification security device. The personal device includes an identification verification system that receives first identification data from a physical identification device, such as by inserting a driver's license into a card reader that is adapted to receive a driver's license. Second identification data such as a PIN number is also received. Payment authorization data or other suitable data is generated if the driver's license corresponds to the PIN. A payment selection system or other suitable system receives the payment authorization data and displays one or more payment accounts for selection by a user. Where a payment selection system is used, the payment selection system transmits payment account data to a point-of-sale system. This includes a fingerprint recognition system associated with the personal device.

U.S. Pat. No. 6,850,916 (Wang) describes a portable transaction arrangement for permitting a user to conduct a charge card transaction vis-a-vis a charge card terminal of an electronic transaction system. The charge card terminal is configured to communicate with a charge card for the purpose of conducting the charge card transaction. The charge card is one of a magnetic stripe card and an electronic smart card.

The portable transaction arrangement includes an emulation card having an emulation card interface. The emulation card interface emulates an interface of the charge card. The interface of the charge card facilitates communication between the charge card and the charge card terminal. There is also included a portable emulation card configuring device arranged to be used in conjunction with the emulation card, which in turn includes a memory configured to store first charge card data pertaining to a first charge card of the user, and an authentication mechanism. The portable emulation card configuring device is configured to write from the memory the first charge card data to the emulation card if the user is authenticated through the authentication mechanism, thereby allowing the emulation card to appear through the emulation card interface, after writing and for the purpose of conducting the transaction, like the first charge card to the charge card terminal and enabling the charge card terminal to read the first charge card data from the emulation card to conduct the charge card transaction.

U.S. Pat. No. 6,844,660 (Scott) discloses methods for obtaining biometric identification data for an individual using a sensor and a processor coupled to the sensor presented. In an embodiment, the present invention involves placing a portion of a biological object such as a finger, thumb, palm or foot of the individual proximate to piezo ceramic elements of the sensor and generating an output signal with the sensor that is representative of at least one feature of the biological object. The output signal is processed using the processor to produce biological data useful for identifying the individual. In an embodiment of the present invention, the sensor includes at least fifty thousand piezo ceramic elements arranged in an array. These piezo ceramic elements are spaced on a pitch equal to or less than approximately two hundred microns. A multiplexer couples the output of the sensor to the processor.

Most of these systems deal with the analysis of the actual data transmitted during the transaction, and only a few deal with identification of the fraudulent card itself. Each of these references is incorporated herein by reference for the entirety of their teachings, including hardware, software and processes.

SUMMARY OF THE INVENTION

The technology described herein is referred to as a system under the name of CardSleuth™ security. It includes or comprises at least a device comprising a portable magnetic stripe reader and computing functionality associated with the magnetic stripe reader, such as hardware and/or software or communication with hardware or software that enables the functioning of a credit card reader/validator, drivers license reader/validator, debit card reader/validator, club card reader/validator, or any other element that can be mechanically read and which ordinarily would contain identification data, value data, credit data or other information potentially of import to commerce or finance. A single device may be needed for evaluation of each type of stripe carrying product (that is, a separate device may be needed for credit cards, for debit cards, for smart cards, for medical identification cards, club cards and the like), or a single device may have multiple functions (e.g., multiple software elements or codes) and can be used (with or without switching to specific identification sequences) for evaluation of different magnetic stripe carrying products. It may be used as a law enforcement device or other form of security device for both physical and economic security, particularly to combat identity theft and financial fraud. It is a particularly useful tool for police officers and other legal authorities to determine instantly if the true purpose for the data contained on a magnetic stripe card is different from the data normally found on that type of card. For example, the device can determine if a room key card carries someone's credit card information. This is important, because it is a typical credit/debit card fraud scheme to take room keys and reprogram/rewrite the information on the key magnetic stripe to duplicate or imitate a credit/debit card The magnetic stripe reader, combined with a finger-print (or other biomarker) reader can also serve to instantly determine if a card is being used by its proper owner. In this case, fingerprint information would be carried in the system and/or on the card, in conjunction with a real-time fingerprint read from the card user. The system may operate to compare the physical nature of the card and the card stripe with the information content on that card, as by either mechanically reading the image or visual printing on the card and comparing it to a standard with both the visual content and the magnetic characteristics read from that card, either in any order or simultaneously. This is an important element of detecting and preventing fraud, as many credit cards are themselves difficult to duplicate, but the electronic data that is sent with a swipe is easy to intercept, copy and record onto an available card that does not have the difficult-to-forge appearance of the true credit card.

The device, along with a web-based service that updates the programs in the device with the most recently detected and reported signatures of disguised cards, and including heuristic programs in the memory of the device: (1) recognizes card data of different types, (such as credit cards, debit cards, identity cards, driver's licenses, casino player club cards, hotel room key cards including Master Keys, and facility-entrance cards.) and (2) is designed to defeat updated disguises designed to make the data look like data from a different type of card or to render the data unreadable.

In a similar manner, the device, the system, and the web-based service can be used with alternative methods of storing personal identity information data, including but not limited to, bar codes, including 2D bar codes; hologram imagery; Smart Cards integrated circuit memory; and to cards that are read in another manner such as a radio frequency tag.

DETAILED DESCRIPTION OF THE INVENTION

Definitions

Figure 1:
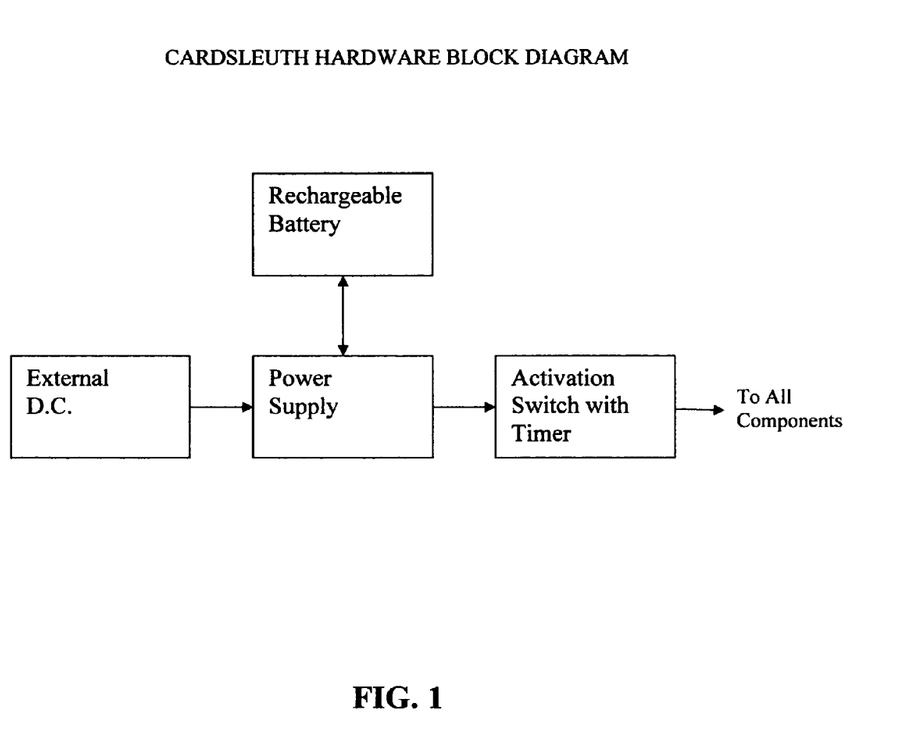
FIG. 1 shows a block diagram of a configuration of apparatus for performance of the present technology.
Figure 2:
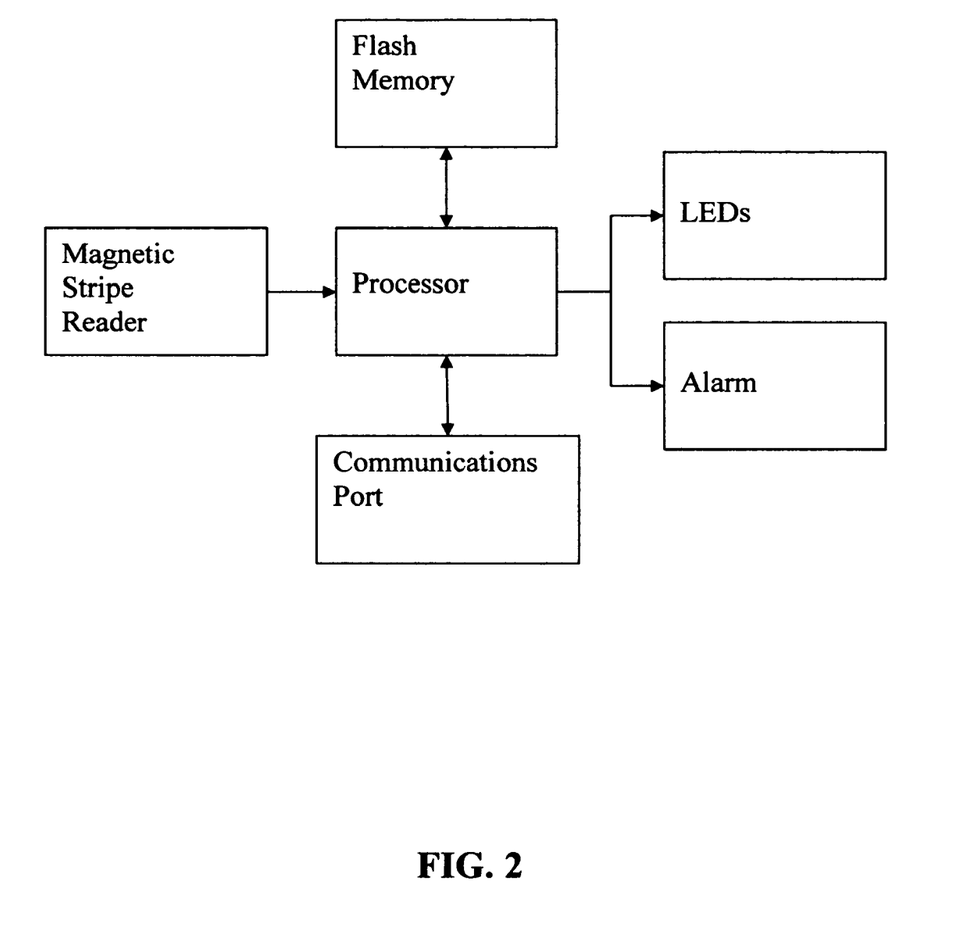
FIG. 2 shows a block diagram of an alternative configuration of apparatus for performance of the present technology.

An Identity Thief, in this case, is one who obtains, or enables another unauthorized user to obtain, cash, products, or services illegally by stealing, carrying or selling information provided on a credit or debit card.

A Credit Card Data Disguise is data that contains the original credit or debit card information in a form rendered unrecognizable as credit or debit card information by means of a change in the data format made by scrambling, adding data, or subtracting data in a way that allows the original data to be restored, at will, by the identity thief.

One element of the present technology that is important is the ability to provide a readily usable and preferably portable system for detection of the correctness or propriety of information retained or recorded on a magnetic stripe. The system, is not intended to be the ultimate solution to credit card fraud or identity theft, but is another important tool against one specific event that often occurs in such crimes, the use of a falsified card with falsified, copied, or forged information on the magnetic stripe. In its simplest form, a device (the reader device) has a card swiped or otherwise read, and the format of the information read and/or its content is compared with the appearance or format of the card. For example, if a card with the physical appearance of a hotel room key is swiped and the data format or data content of the data read from the swipe of the Hotel Key card is that data format or data information of a credit card, the card can be readily identified as a fraudulent card.

Among the CardSleuth system's basic functions are (1) reading the data imprinted on the magnetic stripe, and (2) identifying to administrators such as law enforcement officer what kind of data is encoded. This can be done by a visual image provided on a data output component of the device, which can be as simple as a single in a message screen (e.g., a single line showing 7-element alphanumeric letters and numbers which could display message such as "credit card," "First ban Credit Card," "debit card," "VISA® card," "club card," "prescription card," "health insurance card,", and the like), multiline screen, full image screen (as is provided on cellular phones, PDAs and the like, with full images and multiline data imaging), or simply buttons that are labeled and illuminate when the specific type of card indicated on the button is identified or indicating that no match for the read information is available). The law enforcement officer then knows if the card is being used as a carrier of stolen or specious credit card information, and can, when appropriate, legally arrest the bearer. It is not necessary for the actual content to be readable in the swipe, but that the data format of the information in the magnetic stripe is inconsistent with its outward appearance, and particularly that it is consistent with a data format of a credit card or identity card (e.g., driver's license). By kind of data, data format or data formatting, it is understood that the data on a MasterCard® financial card is organized differently than the data on a hotel room key, and that the pattern or organization is itself recognizable by a swipe through the reader device that can be used in the practice of the present technology. The way data is organized on an American Express card is different from the way data is organized on a casino player's card. The CardSleuth™ system reader makes this determination by identifying the format of the alphanumeric characters. By "format", we mean the sequence and selection of standard alphanumeric characters, symbols, and spaces. The format analysis may also include a determination as to which tracks, of three available tracks, are used or not used in providing information in the magnetic stripe.

In terms of the big picture of providing security backgrounds, the present technology simply breaks one link in the criminal chain of events that may occur after credit and debit card data has been stolen. The CardSleuth™ system does this by helping the law enforcement officer to arrest a thief who possesses stolen credit card information. It performs the simple function of telling the police officer whether stolen or clearly inappropriate information is present on an innocent looking card. Without CardSleuth™ system, the officer cannot readily tell. The programming feature, and the infrastructure that supports it, simply maintains the CardSleuth™ system's ability to recognize credit card data despite the bad guys' attempts to disguise it.

The CardSleuth™ system can also provide the ability to read a birth date on a driver's license and calculate drinking age directly from the information on the card and a clock/calendar in the reader. This is also believed to be unique.

Cardsleuth Update-Service Functions
   a. Establish secure connection between Server and browser.
   b. Authenticate user.
   c. Accept service request.
   d. Validate eligibility for service.
   e. Download software update program to browser.
   f. Verify file integrity of update files in browser.
   g. Run software update program on local computer.
   h. Establish communications between local computer and portable device.
   i. Verify device serial number.
   j. Download software update to device Cardsleuth Portable Device Software Functions
1. Push activation switch to start.
2. Initialize device
3. Read program table to determine string(s) to search for, track number(s), and string location(s) on track(s) (may be more than one string).
4. Activate visual indicator to show readiness for card swipe
5. Read magnetic stripe data.
6. If unable to read (e.g. read error), activate yellow LED and go idle.
7. Analyze all track data.
8. If search string(s) found, light red LED, sound alarm, and go idle.
9. If search string(s) not found, light green LED and go idle.

The technology described herein includes a number of diverse aspects that are related to the same field and advancements in the art. Among those aspects described are methods for determining if a fraudulent magnetic stripe has been printed on a carrier, the method comprising mechanically detecting a physical format for the carrier, reading the magnetic stripe, and comparing the information read from the magnetic stripe to the detected physical format of the carrier. A signal may be provided either when the physical format is inconsistent with the information read or when the physical format is consistent with the information read. Both the information read and information obtained by detecting the physical format are forwarded to a central processor. The central processor may be in the device or may be distal from the device. The forwarded information is compared to information in a database. The information in the database contains information relating to types of credit card information readable from a magnetic stripe and types of inconsistent physical formats of carriers. An operator may cause the card to pass through a programmable magnetic card reader which informs the operator if the magnetic encoding contains information that, in its present state, or when decoded, will or will not permit operation as a credit or debit card. The magnetic card reader is periodically reprogrammed. For example, the magnetic card reader is programmed to update analytic capability respecting newly identified methods of fraud or magnetic stripe content. As new techniques and newly identified masses of stolen generic cards (with identifying, underlying information that can be read) are discovered, that information will be present in the database, and when the underlying information is read from a card, that reading provides the basis for a credit card fraud alert at the site.

The ability to analyze the scanned information can be on the device itself (preferred) or can be transmitted by wireless or hard wire connection to a central database. In either event, the information is upgraded and updated on a regular basis because of the rapidly changing methodologies or quality of the fraud being practiced. The updates can occur during shutdown on the device, during booting of the device, or upon demand (by the user) or command by a central information/ communication system. When uploads are not convenient and the portable system is being used in combination with a central information/processing/database, the portable device may screen through its latest update and then a distal component of the system may evaluate the data with any updates or upgrades that have issued since the last download to the portable system, saving the time needed for downloading immediately before evaluating a card reading event.

A central or local service may transmit information to a remote device that reads the mechanical stripe and its associate processor to make available updated information relating to analysis of magnetic stripe information or carrier format information. The service discovers (is itself updated on a regular basis) methods and codes used by identity thieves to disguise the information contained on the magnetic stripe and makes such methods and codes available to a software routine that is used to reprogram the device or may be accessed by the remote device. A software programming routine may take new disguise information provided by a service and then makes it available to a recognition routine used in the portable device that reads magnetic stripe information and receives information relating to a physical format of a carrier for the magnetic stripe. A software programming routine may recognize credit and debit card information encoded in a magnetic stripe by reconfiguring, adding, and/or subtracting data that was changed from its original form for the purpose of disguising the information. The service may comprise one or more of (Each step may be independently novel):

(1) An investigative process to determine credit card information disguises used by identity thieves to avoid detection of media that contains credit/debit card information.

(2) A process for conveying the disguises so discovered to a programmable card reader or a plurality of programmable card readers.

(3) A process in which disguised data that devices "suspect" in the field is confirmed, not by the device, but by the investigative service. (This process includes devices in the field storing, and automatically transmitting, both data the devices determine to be disguised and also data determined to be "suspicious" to the service. The service would thus serve as a back-up to devices in the field sometimes finding disguised data the devices failed to discover. The investigative service would also use the device-confirmed-disguises, so transmitted, rapidly to add new disguises to its data base.)

A card reader may be provided in which the recognition routine can be reprogrammed to penetrate various disguises used by identity thieves. A Method and apparatus may calculate the age of the cardholder by comparing date of birth information on the card against a date/clock in the reader. A Method and apparatus may verify a match between a biomarker device such as a camera or fingerprint reader and information stored in memory on a card. A card reader may be activated only when the user is authorized by means of a biometric identification device.

The system may incorporate various performance characteristics within the performance of the technology. An important element to appreciate is that the available cards may or should have identifying code or subcode or artifacts that are read by the magnetic reader, and/or the exterior of the card has a physical identity that can be read or identified mechanically or visually. It is presumed that physical reading of the card by an observer will suffice in that form of protection. That is, no store clerk will allow a patron to swipe a hotel key card in a financial transaction attempting to debit a credit card. Such an event would by itself be indicative of active fraud by the clerk or store.

Among the code, subcode or artifacts that might originally have existed on the card and traces of which might still remain might be originating manufacturing information (on the stripe), original location use code (hotel name, store name, and the like), intentional printed subcode required for reading in a particular use (e.g., lock, key, location, city, State, park system), printing defects (especially with forged cards) and the like. The magnetic card reader should be sensitive enough to read both overlain information (e.g., fraudulent material added to the card, original unerased information, and partially erased information, sub code and subtext, and the like. When the totality of the information is read, the system can analyze this information along every available line of analysis to determine if the information is indicative of a pattern, content, or identifiers, alone or in combination with any input (mechanical, automatic or operator) that can be used to assess card validity.

Mass batches of Hotel keys may have magnetic stripe information or even hard particle identification content in the carrier base or stripe, and this information can be made more durable (less readily masked or erased) at minimal expense. This information can be in the database for the card reading analysis system so that when a charge or credit attempt is made from the card, the underlying signal will provide a clear marker for fraud.

It is both a Federal and state offense to be in unauthorized possession of credit or debit cards belonging to another person (as few as two cards in some states). To avoid arrest and prosecution, identity thieves record stolen credit card numbers and related information in two ways:

1) Thieves will record stolen debit or credit card information on the magnetic stripe affixed to a plastic card that does not have the appearance of a credit/debit card but can be read by a standard credit card reader. A favorite example is a hotel room entry, key card. Another is a casino membership player card.

2) Thieves will disguise the encoded stolen data so that when a law enforcement officer uses a portable reader to read the card, the card will not be recognized, by a standard card reader, as a credit or debit card. Of course, a disguised card cannot be read by an ATM either. So, the thieves subsequently re-activate a disguised card by unscrambling, removing or adding the data, effectively removing the disguise, before a card is used.

There are examples of thieves being caught with hundreds of room keys who could not be arrested because the on-site law enforcement officers did not have an available magnetic stripe reader or because the cards did not show up on card readers as credit or debit cards.

The inventors anticipate that soon after card readers are designed that can penetrate disguised data, thieves will change their encoding schemes, or disguises, in an attempt to stay one step ahead of law enforcement. By equipping law enforcement officers with portable readers that have been consistently, and automatically, updated to combat each new disguise scheme, more identity thieves will be apprehended.

Accordingly, the present invention includes a compact, programmable magnetic stripe card verification device that will be used to alarm the user if the type of data on the card is inconsistent with the type of card being scanned (e.g., credit card information on a hotel room key).

It is a further aspect of the invention to provide a magnetic stripe card reader and computing device that is small, battery powered, completely portable, and can be carried in a pocket or attached to a belt. The device consists of an activation switch, a slot for swiping a magnetic card, a magnetic head card reader unit, a processor for evaluating the data, LEDs, or other types of display such as alphanumeric for indicating the result of the evaluation, possibly an audible alarm, and a battery power supply.

It is a further aspect of the invention that the card reader and computing device is programmable. Reprogramming is accomplished in three steps:

(1) Replacing the device's operating system with a version that contains new algorithms and/or look-up tables and/or bug fixes, and/or other modifications, or by replacing data in, or adding data to, memory;

(2) Using a web server-to-browser internet connection to download the new information to the user's computer, and (3) Attaching the user's device, via a communications cable, or communicating in some other way such as Radio or Infrared, to the user's computer equipped with appropriate communications hardware and software. All appropriate interfaces are intended to be secure-HTTP based.

It is a further aspect of the invention that the software of the card reader and computing device is customizable to accommodate an unlimited number of card types that currently exist or might exist in the future.

It is a further aspect of the invention that the software and hardware will be capable of retaining readings in the event that further analysis of the card data might be advisable.

It is a further aspect of the invention that an update mechanism and service will be made available so the software can be changed to reflect changes in the ways in which data might be disguised when it is encoded on a different type of card.

It is a further aspect of the invention that the software inside the device is able to compare data coded in the magnetic stripe (or other such memory) to a date/time clock in the device, to confirm that the card meets a pre-determined standard. For example, the magnetic stripe, or 2D barcode on a driver's license may contain code for a date of birth. Thus, the device would calculate the cardholder's age as an automatic check for legal age for drinking alcoholic beverages. Similarly, the device could automatically check bio-identity information on the magnetic stripe against a finger print reader, facial characteristic, handprint capability built into the device.

Magnetic cards have multiple tracks or multiple lines that can be recorded on and read from. In different uses of stripes on cards, these multiple lines (typically between 2 and 10, more typically between 3 and 5) have distinct formats of code (magnetic information) and different informational content and different formats of recorded messages. Examples will follow, but it is sufficient that the processor used to receive and evaluate signals read from magnetic cards according to the practice of the technologies disclosed herein have analytic systems (hardware and/or software) that can determine the underlying nature (if not the content itself) of the code or information on the various tracks. By identifying the nature of the information on the card (whether or not the content is fully identified), incompatible codes on different lines or the same lines (e.g., door lock key code format and credit card format) on the same card is prima facie indicative of a card having fraudulent content thereon. This information can be readily identified with low power hardware and software, and can be determined swiftly with a card swipe according to the practices described herein.

The technology described herein enables a service comprising at least one of:

(a) An investigative process to determine credit card information disguises used by identity thieves to avoid detection of media that contains credit/debit card information.

(b) A process for conveying the disguises so discovered to a programmable card reader or a plurality of programmable card readers.

(c) A process in which disguised data that devices "suspect" in the field is confirmed, for the device, by the investigative service.

The method and service provided, may enable and allow personal devices to store and automatically transmit data relating to at least one of process (a), (b) or (c). For example, the data may be transferred by connection to a hard wire exchange system or transmitted by wireless (e.g., Blackberry, wireless phone, wi-fi, and the like) connection to a central processor.

Part of the method may include the device recognizing or confirming disguises of information. These disguises may be part of data transmitted, and the disguises may be added to new disguise data in the processor data base.

A card reader can be provided in which the recognition routine can be reprogrammed to penetrate various disguises used by identity thieves, the programming capable of being entered by hard wire connection or wireless connection to a programming transmission source. It is also possible to replace chips with the recognition routine thereon, or to burn existing chips with additional information.

A method and apparatus may also be practiced for calculating the age of the cardholder by comparing date of birth information on the card against a date/clock in the reader. A method and apparatus may also be practiced for verifying a match between a biomarker device such as a camera image (facial recognition, for example) or fingerprint reader and information stored in memory on a card. The card reader may be constructed so that it can be activated only when the user is authorized by means of a biometric identification device.

| SAMPLE CARD FORMATS | |
| --- | --- |
| Credit Card | |
| Track 1: | %B4121741512345678^SMITH/MICHAEL^0603101123450000000006780000000? |
| Track 2: | ;4121741512345678=060310112345678? |
| Track 3: | (empty) |
| Room Key | |
| Track 1: | (empty) |
| Track 2: | (empty) |
| Track 3: | ;08801801906100404871981850000400000008864008020? |

Note:
These non-limiting examples are not intended to be representative of all possible formats of credit cards or room keys.

As can be seen from these two common format examples, the format of the distribution and content of the information among multiple lines of magnetic stripes can be readily distinguished. By reading such codes, quick evaluation of potentially fraudulent cards or cards with fraudulent content on cards can quickly be determined with assurance. Such quick access can provide enforcement authority with rapidly obtained evidence that can establish probable cause for further searches, a warrant, a search warrant and/or an arrest.

What is claimed:

1. A method for determining if a fraudulent magnetic stripe has been printed on a carrier, comprising mechanically or visually detecting a physical format for the carrier, reading the magnetic stripe for information, and comparing the information read from the magnetic stripe to the detected physical format of the carrier to determine a result of whether or not the information read is compatible or not with the physical format for the carrier and identifying when the information read is incompatible with the physical format of the carrier, wherein a wireless service transmits information read from the magnetic stripe to a remote device that interprets the signals read from the magnetic stripe by a programmable magnetic card reader and the programmable card reader's associated processor to make available updated information relating to analysis of magnetic stripe information or carrier format information and wherein the service identifies specific methods and codes used by identity thieves to disguise the information contained on the magnetic stripe by disguising the information to make the data look like data from a different type of carrier and makes such methods and codes available to a software routine at a central processor that is used to reprogram the remote device so that upon subsequent identification of the specific method, an indication signal of the presence of the specific method is provided to a user of the method or is accessed by the remote device so that upon subsequent identification of the specific method, an indication signal of the presence of the specific method is provided to a user of the device.

2. A method for determining if a fraudulent magnetic stripe has been printed on a carrier, comprising mechanically or visually detecting a physical format for the carrier using a magnetic stripe reader, reading the magnetic stripe for information, and comparing the information read from the magnetic stripe to the detected physical format of the carrier to determine a result of whether or not the information read is compatible or not with the physical format for the carrier and identifying when the information read is incompatible with the physical format of the carrier wherein read information is transmitted to a central processor, and the central processor exercises a software programming routine that takes data on new disguise information that was previously unknown to programs in the central processor, the new disguise information making the data look like data from a different type of carrier and the software programming routine performs a recognition routine in a device that reads the magnetic stripe information and receives information relating to a physical format of a carrier for the magnetic stripe and the device provides a signal readable by a user of the device that information read by the device is incompatible with the physical format of the carrier.

3. The method of claim 2 wherein the new disguise information is provided to the central processor through a separate service and the service makes the new disguise information available to the central processor by electronic data download.

4. A method for determining if a fraudulent magnetic stripe has been printed on a carrier, comprising mechanically or visually detecting a physical format for the carrier, electronically reading the magnetic stripe for information, and comparing the information read from the magnetic stripe to the detected physical format of the carrier to determine a result of whether or not the information read is compatible or not with the physical format for the carrier and identifying when the information read is incompatible with the physical format of the carrier, wherein the forwarded information is compared to information in a database accessible by a central processor and wherein the central processor executes a software programming routine that recognises credit and debit card information encoded in a magnetic stripe by reconfiguring, adding, and/or subtracting data that was changed from its original form that is included in the information read from the magnetic stripe the change in the data from its original form disguising the information to make the data look like data from a different type of carrier.

* * * * *